(12) United States Patent
Brydges et al.

(10) Patent No.: US 6,650,283 B2
(45) Date of Patent: Nov. 18, 2003

(54) VEHICULAR TRACKING DEVICE

(75) Inventors: Hugh Brydges, Virginia Beach, VA (US); P. Sean Sawyer, Virginia Beach, VA (US); Amanda D. McCall, Virginia Beach, VA (US)

(73) Assignee: Starchase LLC, Virginia Beach, VA (US)

( * ) Notice: Subject to any disclaimer, the term of this patent is extended or adjusted under 35 U.S.C. 154(b) by 0 days.

(21) Appl. No.: 10/052,373

(22) Filed: Jan. 23, 2002

(65) Prior Publication Data

US 2003/0137448 A1 Jul. 24, 2003

(51) Int. Cl.[7] .......................... H04B 7/185; G01S 3/02; G08G 1/123; G08B 5/22
(52) U.S. Cl. .................. 342/357.07; 342/450; 342/457; 340/990; 340/825.49
(58) Field of Search ................ 342/357.07, 357.09, 342/357.17, 54, 450, 457, 464, 463; 455/456, 457; 340/901–904, 825.49, 990

(56) References Cited

U.S. PATENT DOCUMENTS

| | | | |
|---|---|---|---|
| 4,065,753 A | * | 12/1977 | Paul, Jr. ................ 340/825.49 |
| 4,908,629 A | | 3/1990 | Apsell et al. |
| 5,018,450 A | | 5/1991 | Smith |
| 5,587,715 A | | 12/1996 | Lewis |
| 5,611,408 A | | 3/1997 | Abukhader |
| 6,072,248 A | | 6/2000 | Muise et al. |
| 6,246,323 B1 | * | 6/2001 | Fischbach ............... 342/357.07 |
| 6,512,478 B1 | * | 1/2003 | Chien .................... 342/357.09 |

* cited by examiner

*Primary Examiner*—Thomas H. Tarcza
*Assistant Examiner*—F H Mull
(74) *Attorney, Agent, or Firm*—Kimberly A. Chasteen; M. Bruce Harper

(57) ABSTRACT

The present invention is directed to a system for tracking a fleeing vehicle comprising a frangible tracking projectile and a launcher to propel and attach the tracking projectile to the fleeing vehicle. The launcher is a handheld or vehicle mounted pneumatic gun that uses high pressure gas to fire the projectile at the fleeing vehicle. The tracking projectile comprises an outer plastic casing that holds a GPS receiver, a radio transponder and a power source in an adhesive mixture. When the tracking projectile strikes its target, the plastic casing shatters allowing the adhesive substance to attach the GPS receiver, radio transponder and power source to the fleeing vehicle.

22 Claims, 4 Drawing Sheets

VEHICULAR TRACKING DEVICE

FIELD OF INVENTION

The present invention is directed to a tracking device system comprising a launcher or gun that shoots and attaches a tracking projectile to a moving target, typically a fleeing vehicle. The tracking projectile comprises a global positioning satellite (GPS) receiver and a radio transponder that determine the target's location and transmits the information to law enforcement or other personnel who remotely track the location of the target.

BACKGROUND OF INVENTION

High speed vehicular police chases of criminal suspects create dangerous situations, typically occurring at high speeds and in highly populated areas. These pursuits often result in serious injury to the police, the suspect, or innocent by-standers, generating negative headlines for the police and exposing them to liability for the injuries resulting therefrom. However, these pursuits are often necessary to apprehend violent and dangerous criminals who oftentimes refuse to surrender peacefully.

Several solutions have been proposed in response to the dangers of high speed chases. A system commonly known as "stop sticks" is used by law enforcement personnel to disable a fleeing vehicle. The stop sticks are long sticks have a series of spikes along their outer surface. The stop sticks are placed on the road in the path of a fleeing vehicle in order to puncture the vehicle's tires as it rolls over the stop sticks. Similar to the stop sticks is U.S. Pat. No. 5,611,408 to Abukhader which discloses a spiked projectile launched from a police car to deflate the tires of a fleeing vehicle. The launching mechanism employs an explosive charge or a spring mechanism to launch the spiked projectile in front of the rear tires of the fleeing vehicle, thereby puncturing the tires as the vehicle rolls over the spiked projectile. However, both the stop sticks and the Abukhader device have several drawbacks. First, placing the spiked object in front of a high speed vehicle can be dangerous and haphazard. Second, the driver of the vehicle may lose control after its tires are punctured and may strike nearby pedestrians or police officers. Additionally, new tire designs are being introduced that are resistant to punctures and can function without air in them, negating the effectiveness of these devices.

Other systems are available which disable a vehicle in a controlled manner. U.S. Pat. No. 6,072,248 to Muise et al. discloses a remote vehicle disabling system comprising a receiver in a vehicle which cuts off the vehicle's fuel supply after receiving a signal from a transmitter. The fuel is cut off in stages so that the driver can bring the vehicle to a stop in a controller manner.

In lieu of disabling a vehicle, systems are available that track the location of a vehicle so that police may apprehend the driver at a later time. U.S. Pat. No. 4,908,629 to Apsell et al. discloses a tracking system for stolen or lost vehicles using hidden radio transponders in the vehicle, which upon receiving an activation signal transmits a return signal that enables the vehicle's location to be determined. U.S. Pat. No. 5,587,715 to Lewis discloses a system for locating stolen or lost vehicles using a GPS transmitter/receiver installed on a vehicle. The remote systems of the Muise et al., Apsell et al., and Lewis patents are designed to protect against the unauthorized use of an owner's vehicle, and require the installation of a receiver, GPS or otherwise, in the vehicle. Without the installation of a receiver, the police cannot track the vehicle's location.

SUMMARY AND OBJECTS OF THE INVENTION

The present invention is directed to a system for tracking a fleeing vehicle comprising a frangible tracking projectile and a launcher to propel and attach the tracking projectile to the fleeing vehicle. The launcher is a handheld or vehicle mounted pneumatic gun that uses high pressure gas to fire the projectile at the fleeing vehicle. The tracking projectile comprises an outer plastic casing that holds a GPS receiver, a radio transponder and a power source in an adhesive mixture. When the tracking projectile strikes its target, the plastic casing shatters, allowing the adhesive substance to attach the GPS receiver, radio transponder and power source to the fleeing vehicle.

Therefore it is an object of this invention to provide a system that allows the police to remotely track a fleeing vehicle, thereby eliminating the need for high speed chases. It is a further aspect of the invention to allow the police to track a vehicle without prior installation of a radio transponder, GPS receivers or other special electronic equipment. It is still a further object of the invention to be able to attach a tracking device to a target vehicle in a safe and non-destructive manner.

DETAILED DESCRIPTION OF THE INVENTION

Figure 1:
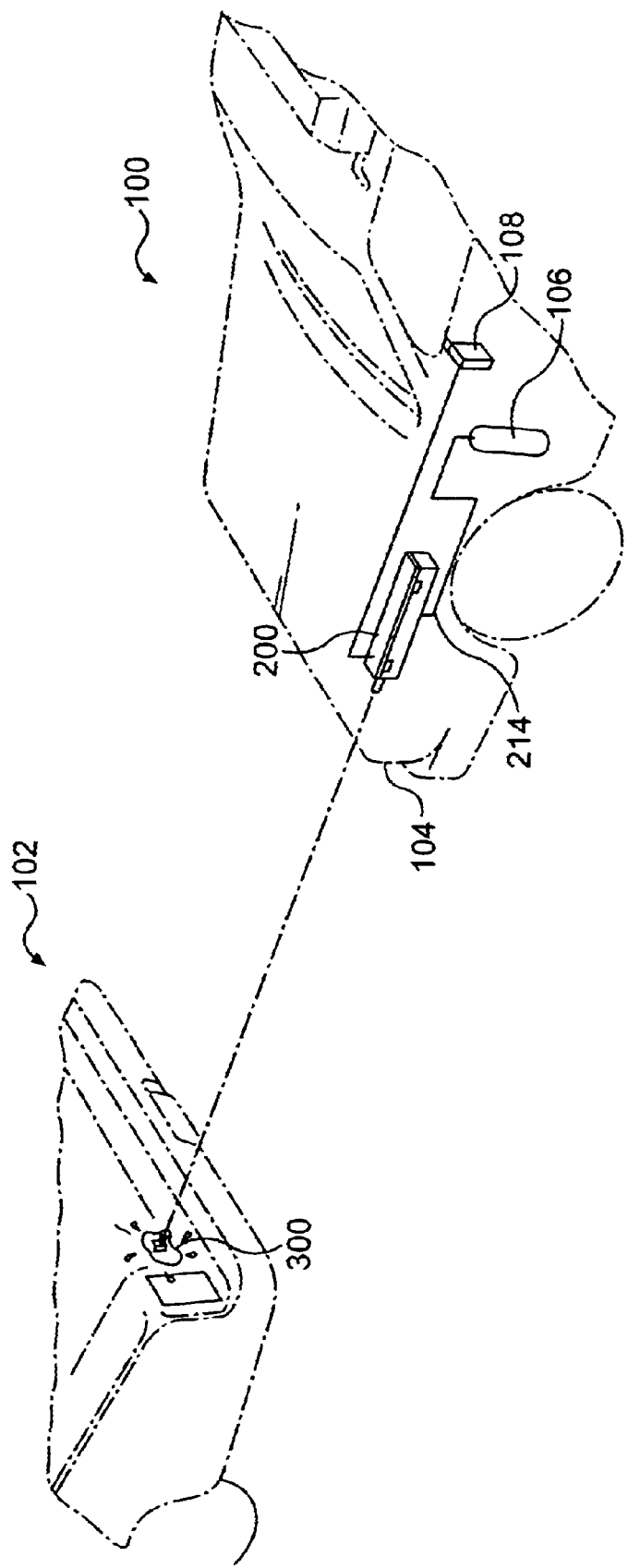
FIG. 1 is a drawing showing a perspective view of a police vehicle firing a tracking projectile device at a target vehicle.

Referring now in detail to the drawings, FIG. 1 shows a police vehicle 100 behind a target or suspect vehicle 102. A tracking projectile 300 is fired from a launcher or gun 200 mounted behind the grill 104 of the police car 100 and strikes the rear of the target vehicle 102. The tracking projectile 300 is fired at a high velocity so that it shatters upon impact with the target vehicle 102, as discussed in further detail herein.

Figure 2:
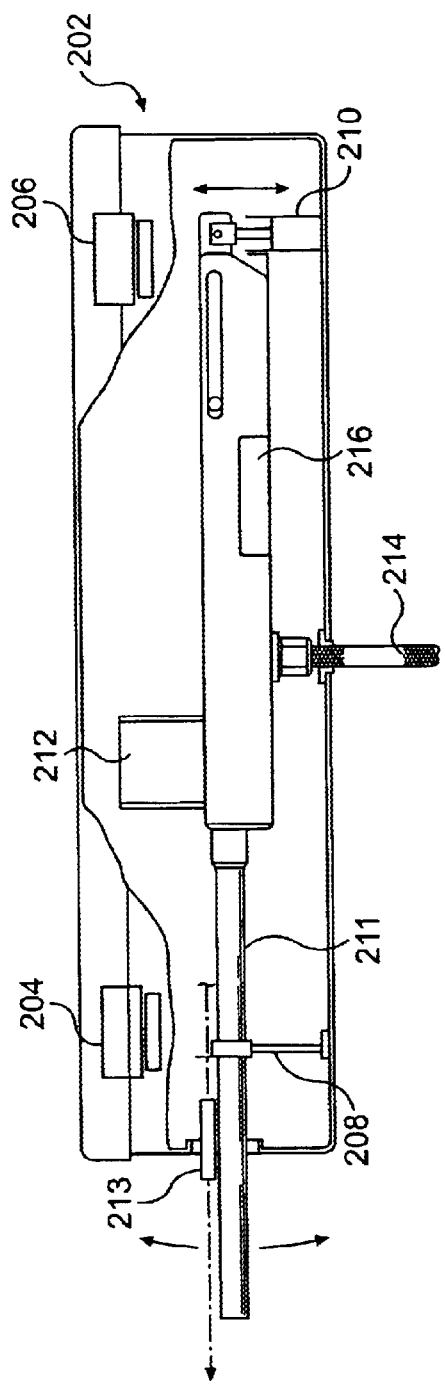
FIG. 2 is a drawing showing a side cut-away view of a tracking projectile launcher.
Figure 3:
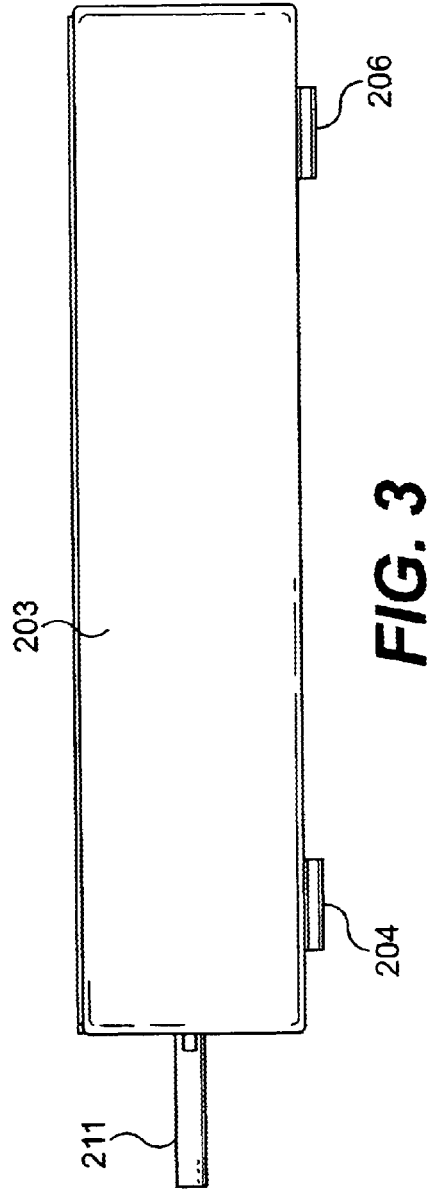
FIG. 3 is a drawing showing a top view of the launcher.
Figure 4:
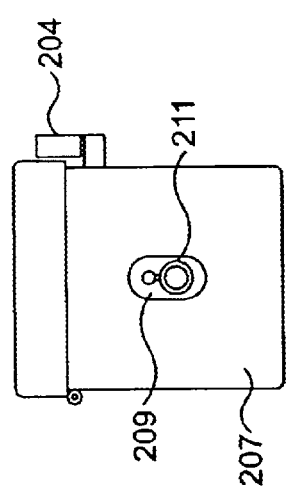
FIG. 4 is a drawing showing a front view of the launcher.

FIGS. 2–4 show the gun 200 in greater detail. The gun is preferably a pneumatic or $CO_2$ gun, commonly used with paintballs, and modified to be placed behind the front grill of a police car. FIG. 2 shows the gun 200 in a sealed box 202 that protects it from the environment and other natural conditions such as rain, snow and dirt. The top of the box 203 has latches 204 and 206 which provide access to the inside of the box, so that the gun may be repaired, cleaned or otherwise maintained. The gun 200 is supported at its front by a hyme or other articulating joint 208, and at its rear by an adjustable support 210. The barrel 211 of the gun extends through an opening 209 in the front of the box 207, providing an unobstructed path for the projectile 300. A laser pointer 213 is placed on top of the barrel 211 to identify the path of the projectile and to mark the target.

The rear adjustable support 210 can be moved up or down 15 degrees to adjust the gun's line of fire. As the adjustable support 210 is moved down, the barrel 211 of the gun rotates upward about the hyme joint 208. Similarly, if the adjustable support 210 is moved up, the barrel 211 of the gun rotates downward. In this way, the gun can be aimed at objects of different heights. An electro-servo motor moves the adjustable support 210 and is operated by a control pad 108 in the police car. The number of adjustments and manipulations necessary to operate the gun is limited to reduce the user's distractions. This makes the gun easier to operate in emergency situations when the user does not have the time to adjust multiple gun settings. Although this is the preferred embodiment of the invention, it should be understood that the invention could be modified to include multiple adjustment mechanisms for the gun without departing from the scope of the invention, to allow for greater versatility in its use. An example would be to have a universal servo mechanism at the rear of the gun so that its aim can be changed both up and down, and left and right.

Figure 5:
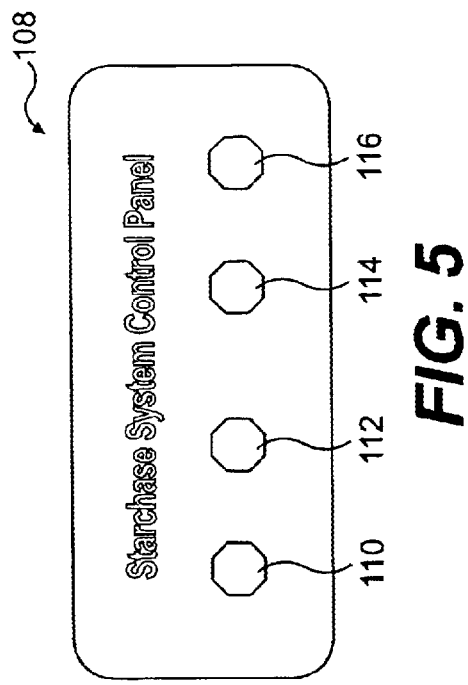
FIG. 5 is a drawing showing a control pad for the launcher.

FIG. 5 shows the control pad 108 in greater detail. The control pad 108 comprises four buttons. The first button 110 is a master on/off switch which when turned on, activates the laser pointer 213 and powers the electro-servo motor for the rear support 210. The second button 112 is a position switch that controls the height of the rear support 210. The third switch provides power to the triggering mechanism and initiates a first servo that clears the barrel of the gun and prepares the gun for firing. This switch also functions as a preventive safety measure by disabling the gun and preventing power from being supplied to the trigger when in the "off" position. The fourth button 116 is the "fire" button and actuates a second servo positioned under the sear and sear spring of the gun that fires the tracking projectile 300. In addition to the fire button 116, the gun may be fired by using a portable trigger button (not shown) that the officer may use when not in his vehicle. The portable trigger button communicates with the second servo to fire the gun by one of any well known wireless methods, such as radio frequency, laser, ultrasonic, etc. The first and second servos are shown generally in FIG. 2 by reference numeral 216.

The tracking projectiles 300 are loaded into the gun by a spring clip 212, or alternatively, may be gravity fed into the gun's chamber. A steel braided, high pressure hose 214 extends from the bottom of the gun and is connected to a high pressure gas supply tank 106, which supplies the pressure or "charge" to fire the tracking projectile 300.

Figure 6:
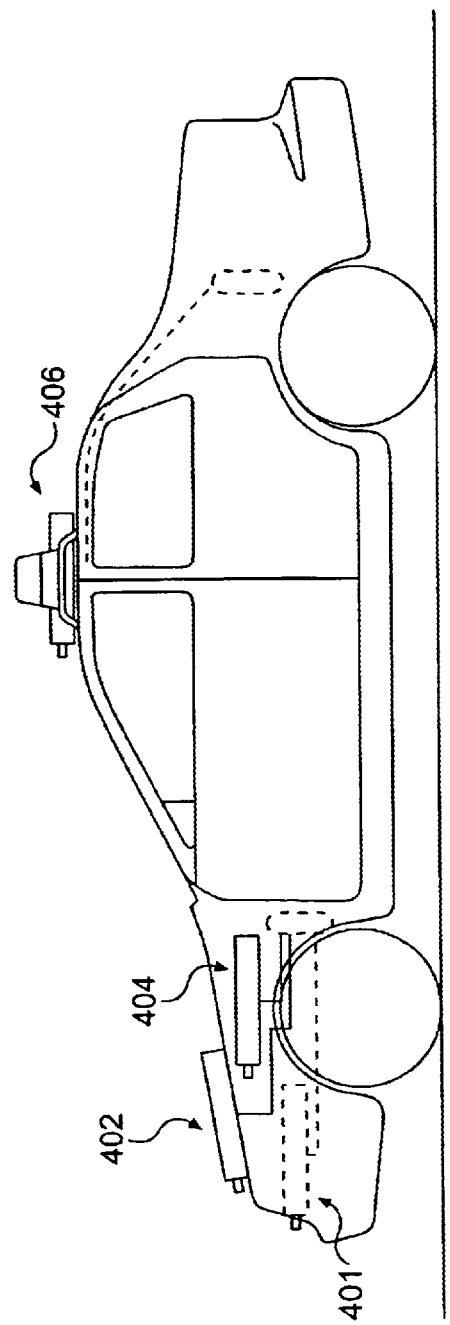
FIG. 6 is a drawing showing a police vehicle having the launcher mounted at various positions.

Although in the preferred embodiment of the invention the gun 200 is mounted behind the grill 104 of the police car 100, as shown in FIG. 6 by reference numeral 401, the gun may be placed in a variety of locations. FIG. 6 shows several other possible locations for the gun, such as on or under the hood of the car 402, on the side of the car 404, or on the roof of the car 406. These embodiments are provided for illustrative purposes and are not meant to limit the scope of the invention to the locations shown in FIG. 6. It will be apparent to one skilled in the art that modifications and variations may be made as to the mounting location of the gun 200 without departing from the scope of the invention.

Figures 7, 8, 9:
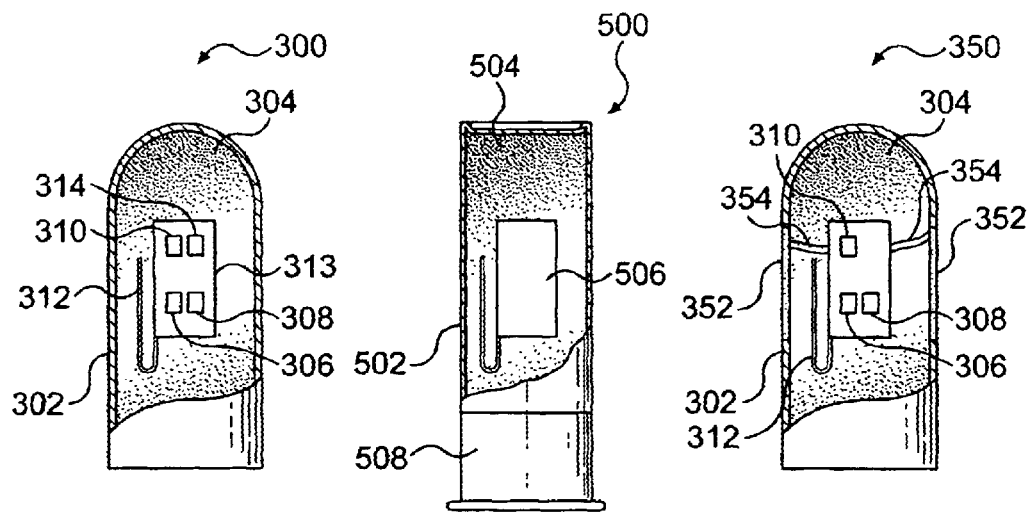
FIG. 7 is a drawing showing a cut-away view of the tracking projectile.
FIG. 8 is a drawing showing a cut-away view of a second embodiment of the tracking projectile.
FIG. 9 is a drawing showing a cut-away view of a third embodiment of the tracking projectile.

FIG. 7 shows a cut-away view of the projectile tracking device 300 of the present invention. The projectile comprises an outer casing 302 made of plastic, glass or other frangible material. The casing 302 must be strong enough to withstand the force of being fired from the gun 200, but must be fragile enough so that it shatters upon impact with the target 102. Inside the casing 302 is a gelatinous adhesive compound 304 which holds a GPS receiver 306, a radio frequency (RF) transponder 308, a battery 310, an antenna 312 and an inertia or pressure switch 314. These electronic components are preferably placed on a single electronic component or chip 313. The adhesive material 304 is used to attach the chip 313 to a fleeing vehicle and can be any material that helps to absorb the shock generated by the firing of the gun and the impact with the target, yet also having a cure rate that ensures that the electronic chip 313 sticks to the target 102. The adhesive must also be able to maintain its adhesive properties in a variety of environmental conditions, such as extreme heat, extreme cold, wet weather, etc. Examples of such adhesives are 3M's SUPER GLUE GEL, product number 05111135-08751 and SUPER STRENGTH ADHESIVE, product number 051131-50096. Although specific examples of the adhesives have been given, it should be understood that any adhesive that meets the requirements of the present invention may be used.

Contained in the adhesive mixture 304 is the electronic chip 313. In the preferred embodiment, the electronic chip 313 is initially in an "off" position to conserve the power in the battery 310. It is connected to the pressure or inertia switch 314 which turns the chip "on" due to the force generated by the firing of the gun 200 or the impact with the target vehicle 102. Once the chip 313 is turned "on," the GPS receiver 306 begins to receive signals from terrestrial satellites to determine its location and conveys that information to the RF transponder 308. The RF transponder then transmits the information to police officers at a central command station who track the fleeing vehicle and direct field officers to its location. Alternatively, the RF transponder 308 may transmit the location of the target vehicle directly to the officer who fired the gun 200 or any other authorized personnel.

In yet another embodiment of the invention shown in FIG. 9, the electronic chip 313 in the projectile 350 is constantly powered or "on." This eliminates the need for the inertia switch 314, however, it requires a means for the battery 310 to be charged so that it has enough energy to power the electronic chip 313 after being fired. The projectile 350 of FIG. 9 is therefore provided with metal contacts 352 along its sides which are connected to the battery 310 by wires 354. Corresponding metal contacts in the clip 212 of the gun 200 (not shown) contact the metal contacts 352 of the projectile to charge the battery 310 from an external power source. Alternatively, the projectile 350 may be kept in a separate battery charging device until just prior to use so that it is fully charged when fired from the gun. It should be understood that other means of charging the battery 310 of the projectile 350 are available, and that the embodiment described above is not meant to limit the scope of the invention.

It is envisioned that the invention will be used in two primary situations. The first is when an officer has pulled a suspect over to the side of the road to investigate whether a crime or other violation has occurred. In this situation, the officer turns the master switch 110 on the control pad 108 to the "on" position, which powers the rear adjustable support 210 and the laser pointer 213. He then uses the position switch 112 to aim the laser pointer 213 at an appropriate flat surface on the target vehicle 102. Before exiting his car, the officer activates the toggle switch 116 which powers the trigger and clears the barrel of the gun so that it is ready to be fired. If the suspect attempts to flee, the officer may fire the gun with the portable trigger button that he is carrying. In the second situation, the officer is pursuing a suspect in a fleeing vehicle. Here, he fires the gun using the same process as the first, except that instead of firing the gun using the portable trigger, the officer fires the gun by closing in on the fleeing vehicle and pressing the trigger button 116 on the control pad 108. In both situations, the vehicle is tracked from a central command center, eliminating the need to chase the vehicle.

Figure 10:
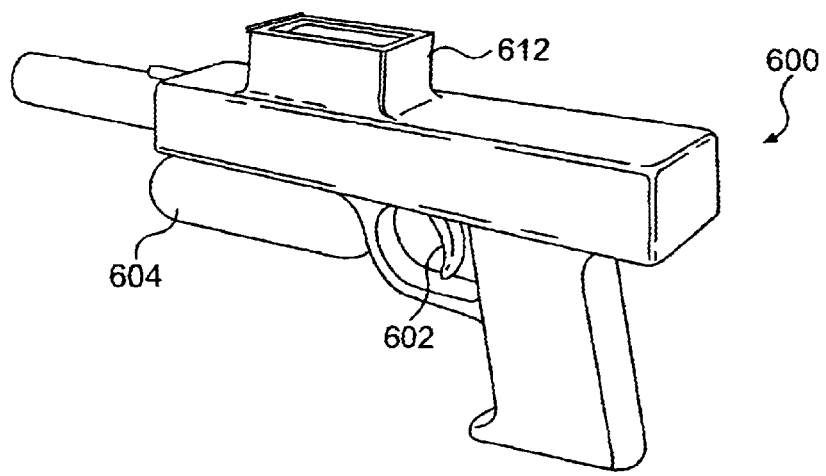
FIG. 10 is a drawing showing a perspective view of a handheld pneumatic gun.

In yet another embodiment of the invention, a handheld gun may be used to launch the tracking projectile. The handheld device may be based on either a pneumatic or shotgun launcher, and allows the operator greater flexibility in aiming and shooting potential targets. FIG. 10 shows a handheld pneumatic gun 600 similar to the one shown in FIG. 2. The tracking projectiles 300 may be gravity fed into the gun or may be loaded via a spring clip 612. The gun 600 is aimed by simply pointing the gun at the intended target and is fired by pulling the trigger 602. The "charge" is provided by a gas canister 604 attached to the gun.

In place of the pneumatic power gun described above, a shotgun-based gun may be used. This requires the use of a modified shotgun shell projectile 500, as shown in FIG. 8. An explosive charge 508 is contained in an end of the shotgun shell 500 to provide the power to propel the shell 500. The shotgun shell 500 is encased in an outer plastic sabot sheath 502 as it is propelled from the barrel of the gun, and is released by the sabot sheath 502 as it exits the barrel. Although only pneumatic and shotgun launchers have been disclosed, any type of gun able to propel the tracking projectile could be used, and the invention is not intended to be limited to these two embodiments.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A tracking system for vehicles comprising:
    a projectile launcher for firing a tracking projectile at a target vehicle; and
    a tracking projectile containing a GPS receiver, a RE transponder and a power source wherein said tracking projectile comprises a frangible outer casing enclosing an adhesive compound, said outer casing breaking upon impact with the target vehicle thereby attaching the GPS receiver, the RE transponder and power source to the target vehicle.
2. The tracking system for vehicles of claim 1, wherein: the GPS receiver, the RE transponder, the power source are a single electronic component.
3. The tracking system for vehicles of claim 2, further comprising:
    a pressure switch connected to the electronic component, the pressure switch activating the electronic component when a pre-determined pressure is applied.
4. The tracking system for vehicles of claim 1, wherein: the GPS receiver receives satellite signals to determine its location, transfers the information to the RE transponder which then transmits the information to a command center.
5. The tracking system for vehicles of claim 1, wherein: said launcher is attached to vehicle.
6. The tracking system for vehicles of claim 1, wherein: said launcher is a handheld unit.
7. The tracking system for vehicles of claim 1, wherein: said launcher is a pneumatic gun.
8. The tracking system for vehicles of claim 1, wherein: said launcher is attached to vehicle.
9. The tracking system for vehicles of claim 8, wherein: said launcher is attached to the front of a vehicle and its aim is remotely controlled by a control pad inside the vehicle.
10. The tracking system or vehicles of claim 1, further comprising:
    a pressure switch connected to and turning on the GPS receiver, the RF transponder and the power source when a pre-determined pressure is applied.
11. The tracking system or vehicles of claim 1, wherein: the tracking projectile includes a device to charge the power source.
12. The tracking system or vehicles of claim 11, wherein: the device to charge the power source comprises metal contacts on an outer casing of the tracking projectile.
13. A projectile for tracking the location of a moving target comprising:
    a frangible outer casing containing a location determining element, a transmitter, and a power source in an adhesive compound.
14. The projectile for tracking the location of a moving target of claim 13, wherein:
    the location determining element is a GPS receiver and the transmitter is an RE transponder.
15. The projectile for tracking the location of a moving target of claim 14, wherein:
    the GPS receiver, the RE transponder, and the power source are a single electronic component.
16. The projectile for tracking the location of a moving target of claim 15, further comprising:
    a pressure switch connected to the electronic component, the pressure switch activating the electronic component when a pre-determined pressure is applied.
17. The projectile for tracking the location of a moving target of claim 14, wherein:
    the GPS receiver receives satellite signals to its location, transfers the information to the RE transponder which then transmits the information to a command center.
18. A method of tracking a vehicle, comprising the steps of:
    identifying a target vehicle;
    launching a tracking projectile at said target vehicle wherein the tracking projectile comprises a frangible outer casing enclosing an adhesive compound, said outer casing breaking upon impact with the target vehicle and attaching a GPS receiver, a RE transponder and a power source to the target vehicle; and
    tracking said target vehicle using tracking information received from said tracking projectile.
19. The method of tracking a vehicle of claim 18, wherein the tracking projectile is launched from a projectile launcher mounted on a source vehicle.
20. The method of tracking a vehicle of claim 18, wherein the GPS receiver, the RE transponder, and the power source are located on a single electronic component, and a pressure switch connected to the electronic component to turn the electronic component on when a pre-determined force is applied to the pressure switch.

21. The method of tracking a vehicle of claim 18, wherein the step of tracking a target vehicle further comprises the steps of:
   receiving vehicle location information in the GPS receiver from satellites;
   conveying the location information to the RF transponder which broadcasts the information to be received by appropriate personnel; and
   determining the target vehicle's location using the location information broadcast by the RF transponder.

22. A method of tracking a vehicle comprising the steps of;
   identifying a target vehicle using a laser pointer;
   firing a tracking projectile at the target vehicle using a tracking projectile launcher;
   striking the target vehicle with the tracking projectile, wherein a frangible outer casing of the projectile shatters and an adhesive compound in the tracking projectile secures a GPS receiver, an RF transponder and a power source to the target vehicle;
   gathering the target vehicle's location information in the GPS receiver;
   broadcasting the target vehicle's location information using the RE transponder; and
   determining the target vehicle's location.

\* \* \* \* \*